United States Patent [19]

Kannes

[11] Patent Number: 5,382,972
[45] Date of Patent: * Jan. 17, 1995

[54] VIDEO CONFERENCING SYSTEM FOR COURTROOM AND OTHER APPLICATIONS

[76] Inventor: Deno Kannes, 2000 Broadway, Suite 119, San Francisco, Calif. 94115

[*] Notice: The portion of the term of this patent subsequent to Oct. 23, 2007 has been disclaimed.

[21] Appl. No.: 942,147

[22] Filed: Sep. 8, 1992

Related U.S. Application Data

[63] Continuation-in-part of Ser. No. 561,448, Aug. 1, 1990, which is a continuation-in-part of Ser. No. 247,904, Sep. 22, 1988, Pat. No. 4,965,819.

[51] Int. Cl.$^6$ .................. H04M 11/00; H04N 7/14
[52] U.S. Cl. ........................ 348/15; 348/14; 348/16
[58] Field of Search ............... 379/53, 54, 96; 358/85; 348/15, 14, 13, 16, 17, 18, 19, 20; H04N 7/14

[56] References Cited

U.S. PATENT DOCUMENTS

| | | | |
|---|---|---|---|
| 3,601,530 | 8/1971 | Edson et al. | 348/15 |
| 3,718,770 | 2/1973 | Reese | 348/15 |
| 3,725,587 | 4/1973 | Klein | 348/15 |
| 3,755,623 | 8/1973 | Cassagne | 348/13 |
| 3,775,563 | 11/1973 | Klein | 348/15 |
| 4,054,908 | 10/1977 | Poirier et al. | 348/15 |
| 4,400,724 | 8/1983 | Fields | 348/15 |
| 4,449,238 | 5/1984 | Lee et al. | 348/15 |
| 4,516,156 | 5/1985 | Fabris et al. | 348/15 |
| 4,650,929 | 3/1987 | Boerger et al. | 348/15 |
| 4,893,326 | 1/1990 | Duran et al. | 358/85 |
| 4,965,819 | 10/1990 | Kannes | 379/53 |

FOREIGN PATENT DOCUMENTS 62-108692 5/1987 Japan.

OTHER PUBLICATIONS

"Telecommunications in the Coming Decades", *IEEE Spectrum* Nov. 1987 Weinstein pp. 62–67.
Bernard A. Wright, "The Design of Picture Phone® Meeting Service (PMS) Conference Centers for Video Teleconferencing", *IEEE Communications Magazine* Mar. 1983, pp. 30–36.

*Primary Examiner*—Curtis Kuntz
*Assistant Examiner*—Stella L. Woo
*Attorney, Agent, or Firm*—Heller, Ehrman, White & McAuliffe

[57] ABSTRACT

A conferencing system for interactive video (and preferably also audio) communication, which includes a composite video signal generation means. The system preferably also includes a recording unit for producing a permanent, combined video and audio record of a conference (which may be a court proceeding such as a criminal arraignment). The system includes a monitor for each conferee, which displays a composite video signal including a principal video image in a large picture region of the monitor screen and secondary video images in small picture regions of the monitor screen. Preferably, all of the large and small picture regions have substantially the same aspect ratio, full secondary video images are displayed in the small and large picture regions, and the full video images displayed in the small picture regions do not obscure any portion of the full video image displayed in the large picture region. In an alternative embodiment, the small picture regions are displayed in a picture-in-picture window which obscures a portion of the principal image displayed in the large picture region.

11 Claims, 8 Drawing Sheets

VIDEO CONFERENCING SYSTEM FOR COURTROOM AND OTHER APPLICATIONS

CROSS-REFERENCE TO RELATED APPLICATION

This application is a continuation-in-part of Ser. No. 561,448, filed Aug. 1, 1990, which is a continuation-in-part of Ser. No. 247,904, filed Sep. 22, 1988, now U.S. Pat. No. 4,965,819.

FIELD OF THE INVENTION

The invention is a conferencing system which allows users to communicate interactively using video and audio signals. More particularly, the invention is a conferencing system for enabling an individual at a remote station to communicate interactively using video and audio signals with a group of conferees at a local station, which generates a composite video signal for viewing by the system users.

BACKGROUND OF THE INVENTION

Civil and criminal caseloads for courts in the United States are large and rapidly increasing. In Los Angeles alone, it is estimated that over two thousand criminal defendants are arraigned each day. The cost of transporting criminal defendants, under guard, between detention facilities and courtrooms is enormous. The process of transporting prisoners, often in shackles, is not only demeaning to the prisoners and expensive, but it is time consuming and presents the risk of prisoner escape and violence directed at court officials and the public.

Another serious and longstanding problem with current court procedure is the need for great numbers of witnesses to travel to courtrooms to attend criminal and civil court proceedings. This represents a tremendous inconvenience and an enormous collective financial burden to the witnesses themselves, and to their employers and families. Furthermore, the witnesses are often victims of rape, child abuse, or other crimes, and must undergo a traumatic courtroom experience when testifying in person in criminal proceedings.

Yet another major, longstanding problem with present day court procedure is that huge volumes of court proceedings must be transcribed by human court reporters. This not only represents an enormous cost, but results in numerous transcription errors.

It would be desirable to eliminate these serious, longstanding procedural problems by allowing witnesses and criminal defendants to participate interactively in court proceedings (by video and audio signals) from locations remote from the courtroom, and by generating permanent, combined video and audio records of court proceedings. However, it has not been known until the present invention how this may be accomplished in a convenient manner, and without prejudicing criminal defendants or diminishing the value of witness testimony.

It would also be desirable to facilitate audiovisual interaction between individuals at local and remote stations (including, but not limited to courtrooms) without distraction by obtrusive video cameras, and in a manner permitting simultaneous observation of the passive as well as the active participants in the interactive process. However, it has not been known until the present invention how this may be accomplished.

Video conferencing systems have been developed, as described for example in U.S. Pat. No. 4,054,908, issued Oct. 18, 1977 to Poirier, et al.; U.S. Pat. No. 4,400,724, issued Aug. 23, 1983 to Fields; U.S. Pat. No. 3,725,587, issued Apr. 3, 1973 to Klein; and U.S. Pat. No. 3,775,563, issued Nov. 27, 1973 to Klein. However, these systems have a number of limitations which diminish their usefulness in general, and their suitability for courtroom purposes in particular.

The video conferencing system of U.S. Pat. No. 4,054,908 includes a video image display unit for each conferee and a video camera for each conferee or group of conferees. However, although many conferees may participate in a conference, each display unit displays only one conferee image at a time. Such image represents the individual conferee speaking in the loudest voice at a given instant, or a group of conferees in the field of view of a single video camera whom are collectively speaking in the loudest voice at a given instant. This limits the visual information available to each conferee. For example, a conferee delivering a statement to one or more of the others cannot view the reactions of each recipient while the statement is being delivered.

The video conferencing system of U.S. Pat. No. 4,400,724 includes N conferee stations, with at least (N−1) video cameras and at least (N−1) video image display units at each conferee station. This system is undesirably complicated and expensive since it requires three or more video cameras at each station for conferences including four or more participants. Further, all conferee stations in this system are identical (there is no provision for a hierarchy of stations having different control capabilities), and the video cameras at each station are separated from the image display units, so that no conferee could simultaneously maintain eye contact with both a camera and an image displayed on an image display unit.

The systems of U.S. Pat. Nos. 3,725,587 and 3,775,563 include a video camera and a video receiver at each of N conferee stations, and a means for displaying the output of each of these video cameras on a different one of N monitors. An additional ("N+1"th) video camera is then focussed on the set of N monitors to generate a single combined video image which may be transmitted to the conferee stations for display on a single video receiver at each station. U.S. Pat. No. 3,775,563 suggests, at column 3, that the combined video image may include a special location (for example, in the center of the receiver screen) for each conferee assigned as a "privileged" conferee. However, the video camera at each station is separated from the video receiver at such station so that no conferee could simultaneously maintain eye contact with both the camera and an image displayed on the screen.

The present invention overcomes these and other limitations of conventional video conferencing systems, and in a preferred embodiment, includes features specially designed for courtroom applications.

SUMMARY OF THE INVENTION

The invention is a conferencing system for interactive video (and preferably also audio) communication, which includes a composite video signal generation means. The system preferably also includes a recording unit for producing a permanent, combined video and audio record of a conference (which may be a court proceeding such as a criminal arraignment).

The system includes a monitor for each conferee, which displays a composite video signal including a principal video image in a large picture region of the monitor screen and secondary video images in small picture regions of the monitor screen. Preferably, all of the large and small picture regions have substantially the same aspect ratio, and the secondary images displayed in the small picture regions do not obscure any portion of the principal image in the large picture region. In an alternative embodiment, the small picture regions are displayed in a picture-in-picture (PIP) window which obscures a portion of the principal image displayed in the large picture region.

In one class of embodiments, the system includes a local module (including a loudspeaker, and a video camera, a video monitor unit, and a microphone for each local conferee), a remote module, and a control module. The local module may be disposed in a courtroom, and may include equipment for use, for example, by a judge and two attorneys (and optionally also a witness). The remote module includes a video camera, a video monitor unit, a microphone, and a loudspeaker. Where the remote module will be employed by a criminal defendant in police custody (for example, at a jail), the remote module will preferably include a control console specially adapted for use by such a criminal defendant, the video monitor unit will preferably include a monitor having a partially reflecting mirror mounted behind the monitor screen, and the video camera will preferably be mounted behind such mirror (so that the defendant may maintain direct eye contact with both an image on the screen and with the video camera).

The control module includes a computer programmed to control the other system components, and may also include the recording unit. The recording unit may include one or more video cassette recorders ("VCRs"), and the audio inputs from all the conferees may be mixed and then recorded on a single VCR audio channel. The programmed computer may receive or generate an "active microphone" signal indicating which local module microphone is active at any instant. The programmed computer may use the active microphone signal to generate control signals for causing the video image corresponding to the active microphone to be displayed in a large picture area of the system's video monitors.

One of the local conferees (typically the judge) is preferably provided with a control console including switches for inhibiting recording of desired combinations of the system microphone outputs, and for preventing transmission of the remote module microphone output to the local module loudspeakers when desired, while permitting such remote module microphone output to be recorded.

In one preferred embodiment, the system includes a still frame video storage unit for storing video prompts, and means for displaying selected ones of these prompts at one or more of the system's video monitors. Preferably, the video prompts are supplied to the remote module as one component of a composite video signal. Preferably, a control console at the local module allows one of the local conferees to select either this composite video signal, or the output of the remote module video camera, for display on a single local module monitor.

DETAILED DESCRIPTION OF THE PREFERRED EMBODIMENTS

Figure 1:
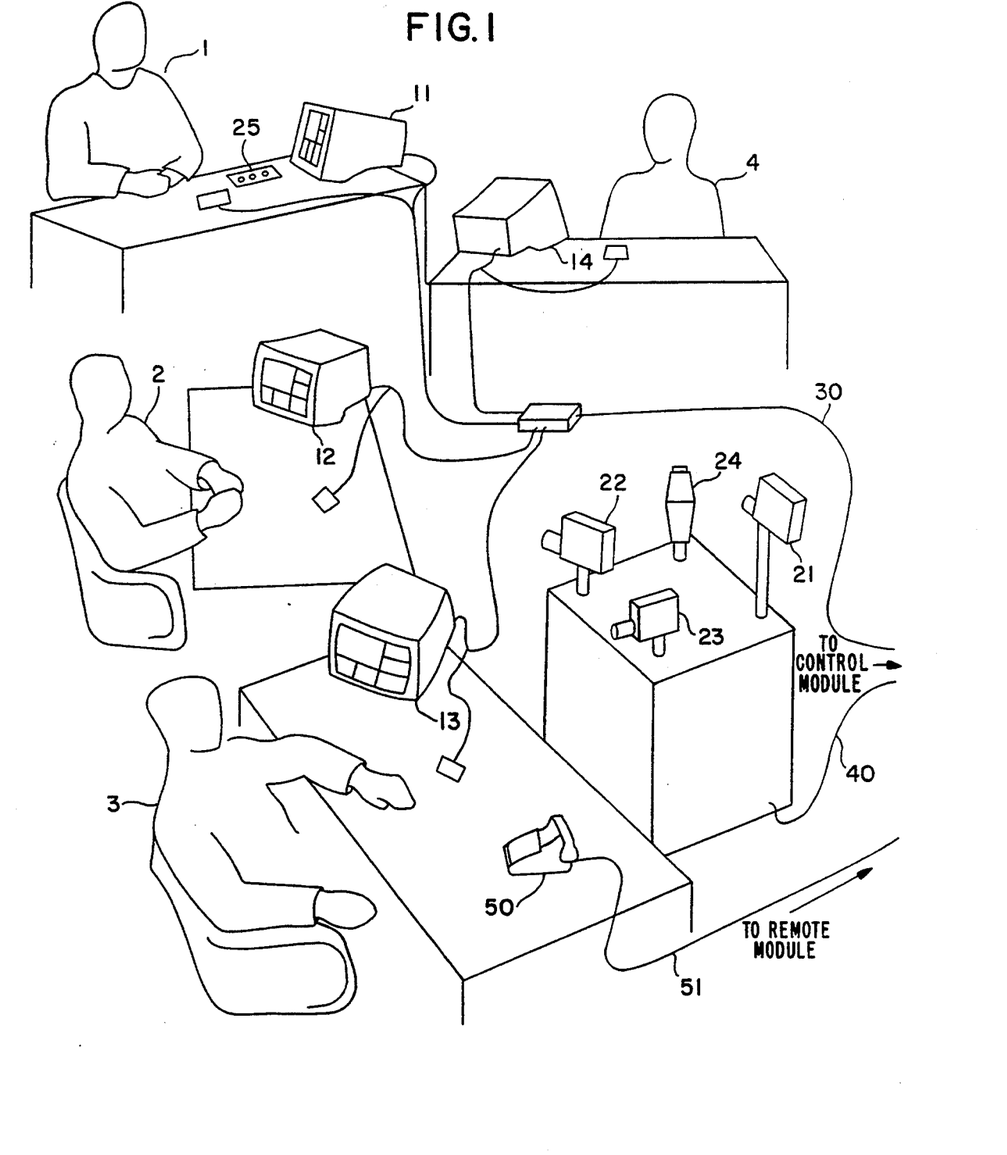
FIG. 1 is a perspective view of the local module of a first embodiment of the invention.
Figure 2:
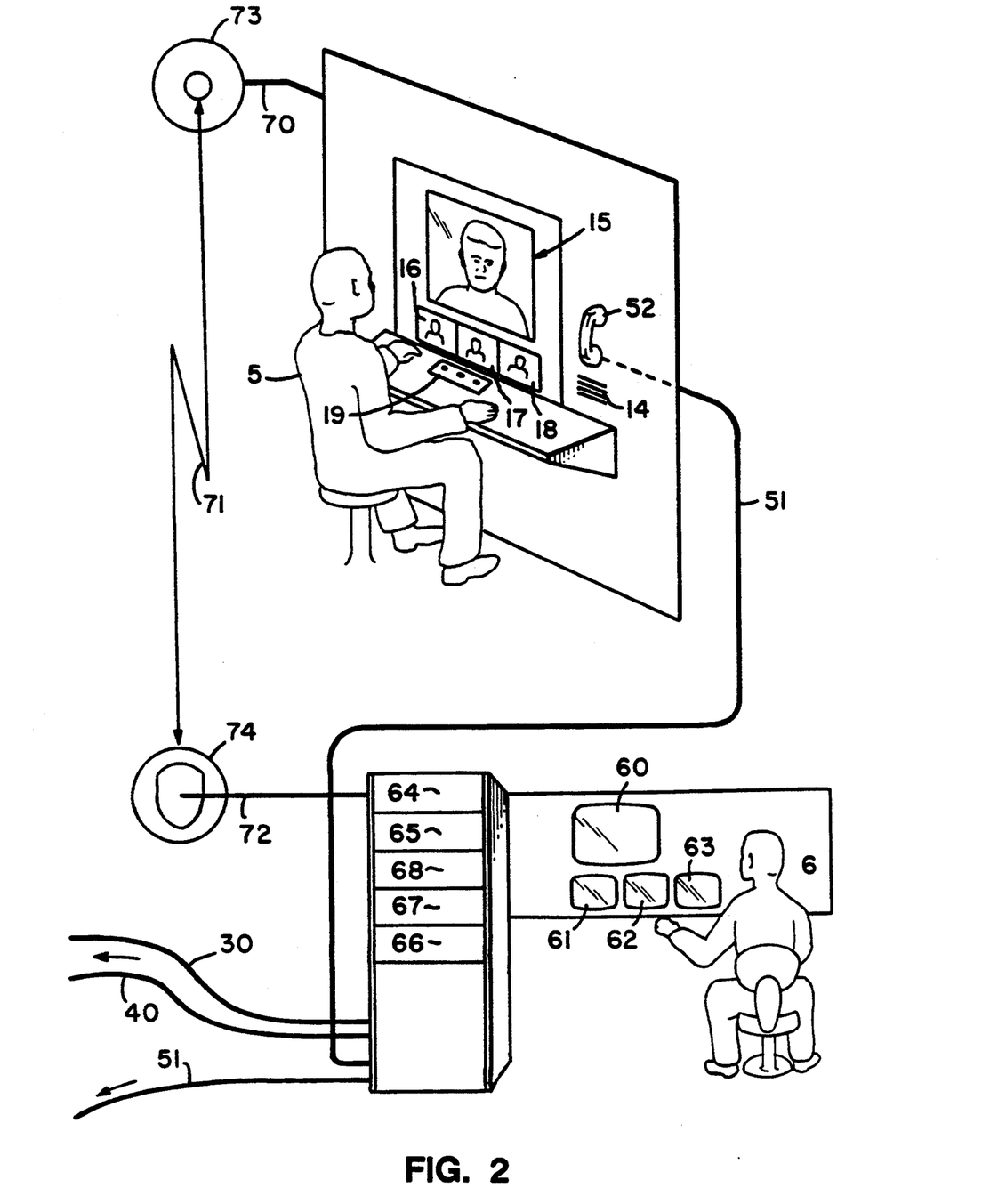
FIG. 2 is a perspective view of the remote module and the control module of a first embodiment of the invention, and a communication link between the remote and control modules.

The overall arrangement of a first preferred embodiment of the invention will be described with reference to FIGS. 1 and 2. FIG. 1 shows major components of the system's local module serving four conferees (judge 1, prosecutor 2, defense attorney 3, and witness 4). FIG. 2 shows major components of the system's remote module (which serves defendant 5), and major components of the system's control module (which is operated by technician 6). Communications link 71 connects the control module with the remote module. Cable 40 connects the control module with the local module. It is contemplated that communications link 71 may be of any conventional type, including, for example, a microwave link or a fiber optic cable for transmitting laser signals. Defense attorney 3 may communicate privately with defendant 5 over the telephone link comprising local telephone 50, remote telephone 52, and telephone line 51.

Each local conferee is provided with one of video monitors 11, 12, 13, and 14. Each local conferee is also provided with a microphone, and a loudspeaker. The term "microphone" is used herein to denote any audio sensor, and the term "loudspeaker" is used herein to denote any audio output device. In FIG. 1, each microphone and loudspeaker is included within a corresponding one of the display units 11-14, and so is not separately shown. The video and signals to be displayed on the monitors and output by the loudspeakers are supplied from cable 40 through cable 30, and the output of each microphone is supplied to cable 40 through cable 30.

Judge 1 is provided with control console 25, which is electrically connected to cable 40, and which preferably includes controls for connecting and disconnecting the output of selected ones of the system microphones (such as the remote module microphone's output) to selected ones of the system's loudspeakers (such as the local module loudspeakers), for independently connecting and disconnecting desired ones of the system's various audio channels to the signal recording means in the control module.

Each of video cameras 21, 22, 23, and 24 may be aimed at one of the local conferees, or may provide a wide angle view of all or part of the local module. The video signals that are output by cameras 21-24 are supplied to the control module on cable 40.

Figure 4A:
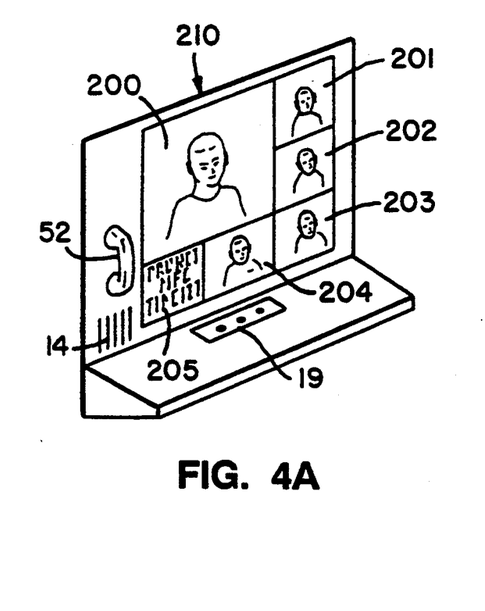
FIG. 4A is a perspective view of another preferred embodiment of the inventive remote module, including a video monitor screen which displays a composite video signal comprising six full video images, with each of the images occupying a different region on the screen.
Figure 4B:
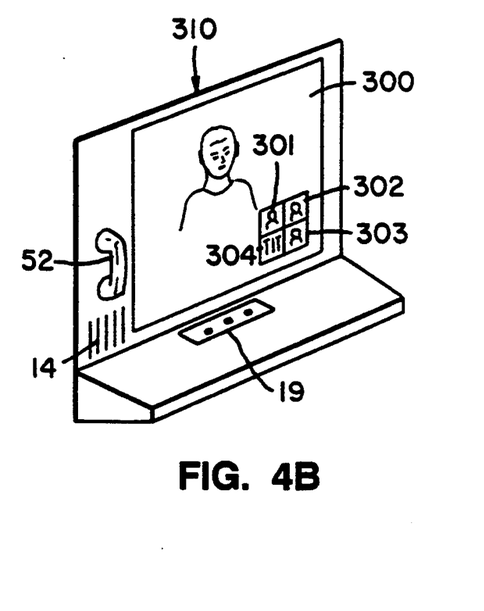
FIG. 4B is a perspective view of yet another preferred embodiment of the inventive remote module, including a video monitor screen which displays a composite video signal comprising five images (one of which is a partial video image), with each of the images occupying a different region on the screen.

At the remote module (shown in FIG. 2), remote conferee 5 is provided with one or more video monitors (such as monitors 15, 16, 17, and 18) for viewing the output of local module cameras 21, 22, 23, and 24. Preferably, a single monitor for displaying a composite video signal (as shown in FIG. 4A and FIG. 4B) is provided at the remote module, because in this embodiment only a single video signal reception circuit need be provided at the remote module. In contrast, where the remote module includes four separate monitors, four separate video signal reception circuits must be provided at the remote module.

Remote conferee 5 may communicate directly with local conferee 3 using telephone 52, which is connected to local telephone 50 by line 51. The telephone link comprising telephones 50 and 52, and line 51 may be secured by providing voice scrambling circuitry and scrambled signal decoding circuitry at each of phones 50 and 52. In one preferred embodiment of the invention, an interface is provided for sending a "private line" signal to the system computer (computer 68, shown in FIGS. 2 and 5) whenever the telephone link comprising telephones 50 and 52 is in use. In response to such private line signal, computer 68 will preferably send control signals to appropriate system switches or relays in order to disable recording of conferee 3's microphone and conferee 5's microphone. For example, computer 68 may send such control signals to a normally closed double pole relay, in order to open the relay in the event that the computer detects that both telephones 50 and 52 are in an "off hook" condition.

Control console 19 may include controls such as audio volume controls, or controls for switching the assignments of the video signals between different remote module monitors (or between different PIP regions of a single remote module monitor), or the like. Audio unit 14 includes a microphone (such as microphone M-5 of FIG. 6) and a loudspeaker (such as loudspeaker 14a of FIG. 6). A video camera aimed at conferee 5 is hidden behind monitor 15, in a manner to be described below with reference to FIG. 3. Video and audio signals flow on cable 70 between the remote module and transceiver unit 73 of communications link 71.

In one embodiment, monitor 15 is a "principal" monitor that is larger than monitors 16, 17, and 18, and is centrally positioned with respect to monitors 6, 17, and 18. An active, voice sensitive switching means (such as that described below with reference to FIGS. 4-6) selects a video signal from any one of cameras 21-24 for display as a "principal" image on principal monitor 15. The voice sensitive switching means continually updates the principal video signal selection. Preferably, the voice sensitive switching means will select for display on principal monitor 15 the video image associated with an active one of the local module microphones. In one preferred embodiment, if two local conferees attempt to speak nearly simultaneously into their microphones, software (to be described below) within computer 68 will select the microphone of the first local conferee to speak as the " active microphone." If two local conferees speak simultaneously into their microphones for at least a preselected time period, the software will select first one and then the other conferee (in a preset alternating pattern or with a preset frequency) as having the "active microphone." For example, when judge 1 is addressing defendant 5, the output of the camera aimed at judge 1 (camera 21) will appear on monitor 15, and when prosecutor 2 is addressing defendant 5, the output of camera 22 (the camera aimed at the prosecutor) will appear on monitor 15, when both judge 1 and prosecutor 2 speak simultaneously (for less than a preselected time period), the image of the one who commenced speaking sooner will appear on monitor 15, and when both judge 1 and prosecutor 2 speak simultaneously (for at least the preselected time period), the images of the two will appear alternatingly on monitor 15.

It should be appreciated that in a preferred embodiment, monitors 15-18 are replaced by a single monitor which displays a composite video signal (for example, of the type to be described with reference to FIG. 4A and 4B). This "composite video signal" embodiment allows tremendous equipment cost savings at the remote module, and allows use of a simpler and less expensive transmission link (71-73) capable only of transmitting a single video signal from the control module to the remote module. In the composite video signal embodiment, the voice sensitive switching means described in the previous paragraph will select a principal video image for display in a principal region of the monitor's screen (which will typically be a "large picture" region, in contrast with one or more "small picture" regions in which the other component signals of the composite video signal are displayed). The monitor which receives such composite video signal from the composite video signal generating unit will sometimes be referred to herein as a "PIP monitor." The voice sensitive switching means will swap the component video signals of the composite signal between different regions on the PIP monitor's screen, so that the component signals are reshuffled (or rearranged) on the PIP monitor screen from time to time, but so that each component video signal is separately discernible at any instant during operation of the PIP monitor.

At the control module of FIG. 2, video signals from cameras 21-24 arrive on cable 40. The four video signals from cameras 21-24 may be combined into a single composite video signal by means (to be described below) and the composite signal then supplied to all the system monitors.

The video signal from the hidden remote module camera arrives at the control module on cable 72 (cable 72 is coupled to transceiver 74 of communications link 71). All or some of the video signals arriving at the control module may be displayed on monitors 60, 61, 62, and 63 and recorded by video recording units 64, 65, and 66. Units 64-66 may be conventional video tape recording/playback units. Audio signals from the local and remote module microphones arrive at the control module on cables 40 and 72, and are recorded on audio channels in video recording/playback units 64-66.

Programmed computer 68 is provided for sending and receiving control signals to and from the various system components in a manner to be described below.

Still frame video storage unit 67 is provided for storing still frame messages (sometimes denoted herein as "prompts") and transmitting selected ones of the still frame messages for display on desired ones of the local and remote monitors. Such prompts may alternatively be generated by computer 68 as a result of a character generation software algorithm. A prompt may be transmitted to the remote module monitor, for example, to inform the remote conferee (i.e., defendant 5) that his or her words are being recorded, but are not being received by selected local conferees in the local module (courtroom).

Preferably, the control module includes an audio mixing means for mixing the audio signals received from the local and remote module microphones so that the output of the mixing means may be recorded on a single audio track of at least one of recording units 64–66. Where the combined video and audio record produced in recording units 64–66 is the record of a criminal or civil court proceeding, such combined video and audio record produced by the inventive system is a substitute for a traditional written record that would otherwise need to be prepared by a human court reporter. It is specifically contemplated that the invention may be employed to produce combined video and audio records of any of a variety of conferences (including proceedings other than court proceedings), among local and remote conferees (or local conferees only).

In one variation on the system described with reference to FIGS. 1 and 2, the remote module is not included, and the system thus includes only a local module and a control module. In this variation, the system is capable of producing a combined audio and video record of a conference among local conferees. It is also contemplated that, in variation on the system described with reference to FIGS. 1 and 2, the remote conferee is not a criminal defendant, and is instead a non-party witness or other conference participant.

In another variation on the system described with reference to FIGS. 1 and 2, the local module may include a single video monitor and video camera (with associated microphone and loudspeaker) for use by a defense attorney. This arrangement allows a defense attorney at a local module location to interview a defendant at a remote module location using audio and video signals transmitted over communications link 71 of the inventive system, with or without generating an audio/video record of such interview.

Figure 3:
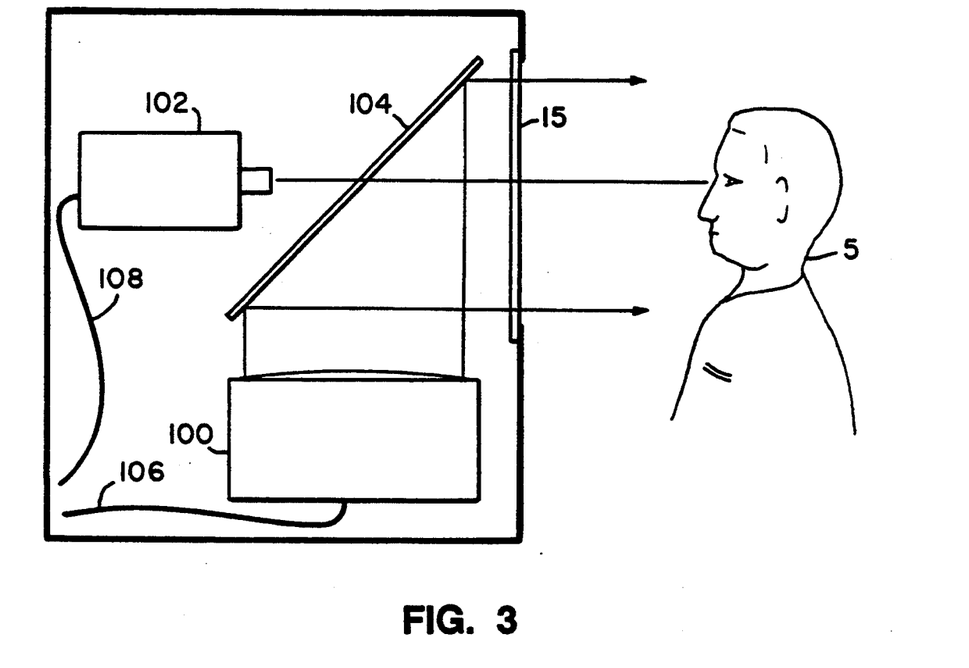
FIG. 3 is a simplified side cross-sectional view of a video display unit including a concealed video camera, of the type included in a preferred embodiment of the inventive remote module.

FIG. 3 shows video camera 102, which is hidden behind the screen of principal monitor 15 of the remote module. Video camera 102 is aimed at remote conferee 5, and receives the image of conferee 5 though transparent monitor screen 15 and partially reflecting mirror 104. At the same time, a video image is displayed on video display unit 100 and is reflected from display unit 100 toward conferee 5 by partially reflecting mirror 104. Thus, while camera 102 is monitoring conferee 5 through partially reflecting mirror 104, conferee 5 views the reflected video image from video display unit 100 through transparent screen 15. The output signal from camera 102 is supplied to cable 70 (shown in FIG. 2) by line 108. Display unit 100 receives its input video signal on line 106, which is in turn connected to cable 70.

The FIG. 3 configuration is an important feature of the inventive system since it allows conferee 5 to maintain natural eye contact with the video image of one of the local conferees while addressing that local conferee (or another local module conferee). Concealment of video camera 102 behind mirror 104 and screen 15 also reduces the risk that conferee 5 will be distracted by the inventive apparatus when attempting to address remarks to the local conferees. For example, in a preferred embodiment of the invention, if judge 1 addresses a question to conferee 5, the image of judge 1 will appear on display unit 100 and will be reflected by mirror 104 so as to be visible to conferee 5 on screen 15. Camera 102 may then record conferee 5's response to the judge's question while conferee 5 simultaneously observing the judge's reaction to this response.

In one version of the invention, remote module control panel 19 (shown in FIG. 2) includes a control means allowing conferee 5 to select the image of any of the local conferees for display on unit 100 (and hence on screen 15). Alternatively, video signal selection in the inventive system may be fully automated (in accordance with the computer-implemented algorithm described in this Specification), and not responsive to a control signal from any conferee.

In a preferred embodiment of the invention, only a single video monitor (monitor 15) is provided at the remote module, rather than several video monitors. This single monitor (sometimes referred to herein as a PIP monitor) displays a composite video image representing the output of a number of video cameras (for example, the outputs of either three or four of the local module video cameras 21–24 as well as the output of the remote module video camera), and also a video prompt (which may be a prerecorded still frame video signal). Each component image of the composite video image (there may be four, five, or six such component images) is allocated a portion of the PIP monitor's screen, so that the viewer may scan the activities of several of the conferees (and also the currently displayed prompt) at a single glance.

Video monitor 210 of FIG. 4A displays a composite video signal having six component video signals, each in a different one of non-overlapping picture areas 200, 201, 202, 203, 204, and 205. Monitor 210 is shown mounted in a remote module similar to the remote module shown in FIG. 2, although it may be substituted for any of the other monitors described herein (such as monitors 11, 12, 13, and 14). The remote module of FIG. 4A includes telephone 52, control console 19, audio unit 14 (including a microphone such as microphone M-5 of FIG. 6, and a loudspeaker such as loudspeaker 14a of FIG. 6), as does the remote module of the FIG. 2 embodiment. Preferably, a video camera aimed at the remote conferee is mounted behind the screen of monitor 210, in the same manner that camera 102 is mounted behind monitor screen 15 in FIG. 3.

In FIG. 4A, the "principal" video image is displayed on the "large picture" region 200 at the upper left of monitor 210's screen (in the sense that region 200 is on the viewer's left, in the upper portion of the screen). Portion 200 may cover approximately 80% of the total area of monitor 210's screen. Each of the other video camera images and the prompt occupies one of "small picture" regions 201, 202, 203, 204, and 205 of the remaining lower right portion of the screen's area. In the FIG. 4A embodiment, regions 201–205 are identically sized and shaped rectangular regions, and each of regions 201–205 has substantially the same aspect ratio as does region 200. An important advantage of the FIG. 4A display over the PIP display shown in FIG. 4B is that the small pictures displayed in regions 201–205 do not obscure any portion of the large picture displayed in region 200, while each of the small pictures displayed in the PIP window comprising regions 301–304 obscures a portion of the large picture displayed in region 300. It is contemplated that picture areas 200–205 may be rearranged, so that large picture area occupies the upper right corner of the screen, rather than the upper left corner as shown.

The remote module equipment shown in FIG. 4B is identical to that of FIG. 4A, except that monitor 210 is replaced by monitor 310. Monitor 310 displays a composite video signal comprising five component signals. The "principal" video image is displayed on monitor 310 in large picture region 300 of monitor 310's screen. Each of the other video camera images and the prompt occupies one of small picture regions 301, 302, 303, and 304. Small picture regions 301–304 comprise a small rectangular picture insert area or "PIP window" ) within region 300, and this window obscures a portion of the video image displayed in region 300. In the FIG. 4B embodiment, regions 301–305 are identically sized and shaped rectangular regions, each forming one quadrant of a PIP window.

Equipment for generating the composite video signal displayed on PIP monitor 310 will be described below with reference to FIGS. 5 and 6, and equipment for generating the composite video signal displayed on monitor 210 will be described below with reference to FIGS. 7–9. The inventive system's voice sensitive video image switching means (partially described above, and described in greater detail below with reference to FIGS. 5–6) may be employed to select (and continuously update) a "principal" image for display on the large picture region (200 or 300) of a video monitor's screen.

Preferably, the composite video signal generated for display on one or more of the system's video monitors is recorded on a single channel of a video signal recorder to serve as the video portion of the permanent conference record. The audio portion of the conference record preferably includes a record of the mixed output of all the local module microphones, together with separate recordings of the discrete output of each local and remote module microphone.

In one preferred embodiment, the mixed output of the local module microphones is recorded on one of the normal Left and Right audio channels of a conventional stereo video cassette recorder, and the output of the remote module microphone is recorded on the other of such Left and Right audio channels. Thus, the output of all the local and remote microphones will be audible when the conference record is played back. Preferably, two of the discrete local microphone records are also recorded on the "Hi Fi" Left and Right channels of the stereo video cassette recorder (which are different from the normal Left and Right stereo audio channels), so that a total of four audio signals are recorded on the video cassette recorder. The two discrete local microphone records would normally be played back only in the event that the mixed local microphone is obscured or otherwise inaudible.

Figure 5:
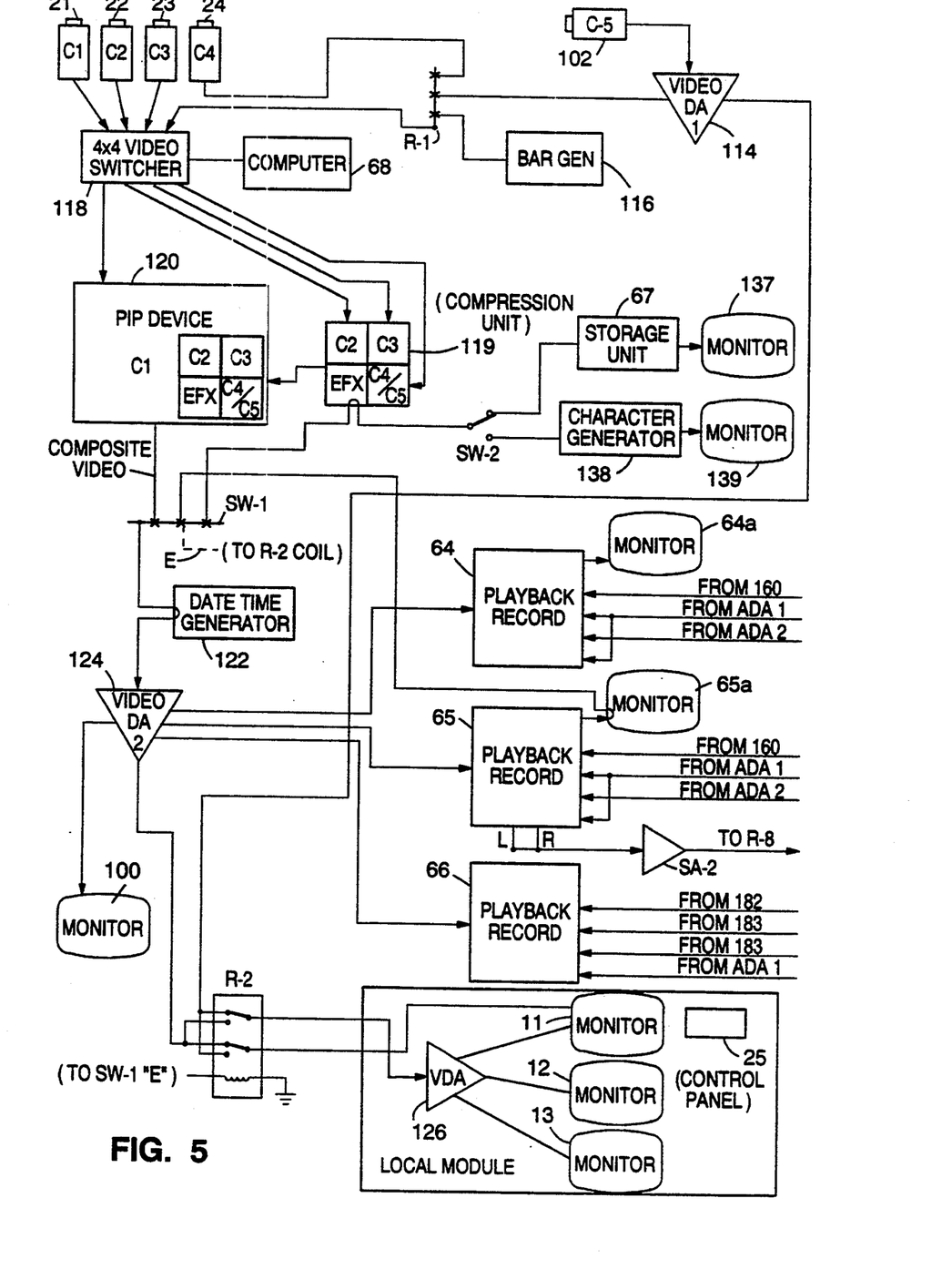
FIG. 5 is a diagram of a first portion of an embodiment of the invention.
Figure 6:
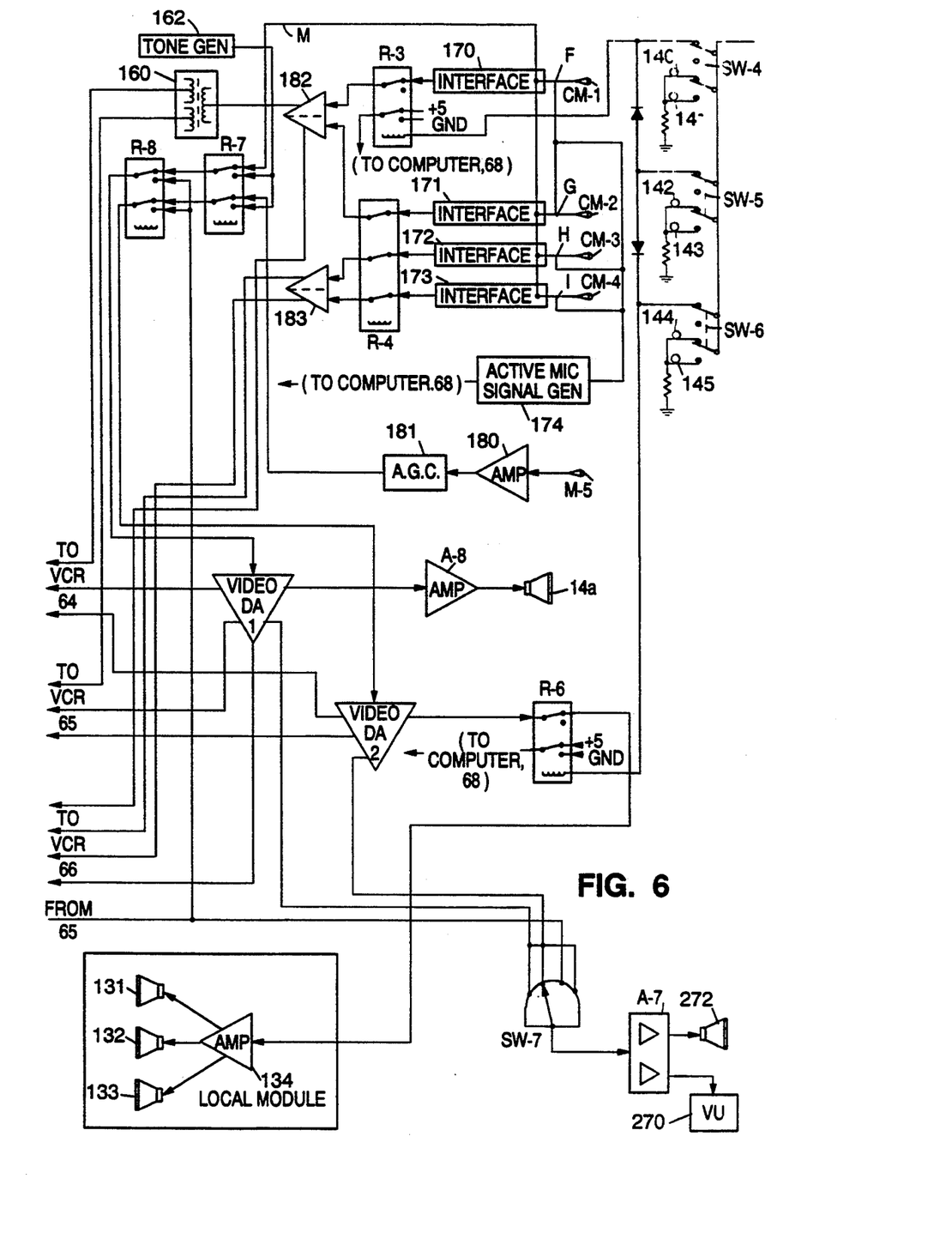
FIG. 6 is a diagram of a second portion of the embodiment partially shown in FIG. 5.

FIGS. 5 and 6 are circuit diagrams, each showing a different portion of a preferred embodiment of the inventive system. In FIG. 5, local module video cameras 21, 22, and 23 supply video signals to 4×4 video switching unit 118, controlled by computer 68 (corresponding to computer 68 shown in FIG. 2). Local module video camera 24 supplies a video signal to one input of 3× video switching unit R-1. Remote module video camera 102 supplies a video signal through video signal amplifier 114 to a second input of 3× video switching unit R-1. Amplifier 114 also sends the amplified output of camera 102 to video relay R-2 (to be discussed below). Signal generation unit 116 supplies a video signal to a third input of 3× video switching unit R-1. Unit 116 may be an NTSC bar generator. The purpose of switching unit R-1 is to allow any selected one of the three mentioned video signals input to unit R-1 to be fed to the fourth input of switching unit 118. The signal from camera 24 will be fed to unit 118 in the case that the inventive system is to be used in an electronic court recorder mode, to monitor and record a proceeding conducted solely by persons in the local module. The signal from camera 102 will be fed to unit 118 in the case that the inventive system is to be used in a mode facilitating a conference (such as an arraignment or other court proceeding) between local and remote conferees. The signals from unit 116 may be video level reference signals, that are normally provided to unit 118 of the inventive system only in a test mode of operation (and not in a normal conference mode).

Computer 68 generates signals for commanding switching unit 118 to select a "principal" one of the video signals received at the inputs of unit 118 for direct transmission to picture in picture ("PIP") device 120. Device 120 is preferably positioned in the system's control module, and the composite video output of PIP device 120 is made available as an optional signal for display not only on remote module monitor 100, but also on local module monitors 11, 12, and 13. Alternatively, the output of device 120 may be provided only to remote monitor 100. The other video signals received at the inputs of switching unit 118 (the three signals other than the principal signal routed directly to unit 120) are supplied from unit 118 to video signal compression unit 119. The video signal emerging at the output of switch SW-2 is also supplied to unit 119. Unit 119 generates a composite video signal by compressing the video signals that it receives. The video images comprising this composite video signal are separately discernible when the composite video signal is displayed on a video monitor. For example, each may occupy a different one of four quadrants 301, 302, 303, and 304 in a window on a PIP monitor screen 310, as shown in FIG. 4B. Compression unit 119 may be selected from commercially available units performing the described function.

The composite video signal emerging from unit 119 is supplied to PIP device 120, wherein it is combined with the "principal" video signal received directly from unit 118, in a manner so that the composite signal from unit 119 will be displayed in a small picture area of a video monitor screen at the same time the principal video signal is displayed on a large picture area of the monitor's screen. Thus, the output of PIP device 120 is a combined video signal having five separately discernible component images, which may be displayed on a single PIP monitor.

In either the FIG. 4A or FIG. 4B embodiment, the large picture area of each of the system's monitor screens is preferably positioned at the left edge of the monitor screen, rather than at the right edge. This split screen arrangement reflects the results of tests, which have shown the preferred horizontal scanning direction of a typical human eye.

In the preferred embodiment shown in FIG. 5, unit 119 is a quad split unit which processes the four signals it receives so that each may be displayed in a different quadrant of a rectangular video screen. The output of unit 119 in such embodiment is then combined in PIP unit 120 so that the output of unit 120 is a composite signal of the type displayed on PIP monitor 310 in FIG. 4B. In this embodiment, PIP unit 120 may be selected from commercially available units performing the described function, and units 118, 119, and 120 together comprise a composite signal generating means.

In the FIG. 5 embodiment, the video signal emerging at the output of switch SW-2 is supplied to the composite signal generating means 119. Switch SW-2 selects one of the video output signals provided by video signal storage unit 67 and character generator unit 138. Storage unit 67 may be a video disk storage unit, and the video signals stored therein and output therefrom to switch SW-2 may be still frame signals (for example, still frame video messages for prompting the local or remote conferees to take specific actions). The video signals supplied by character generator 138 to switch SW-2, may also be single video frame "prompts." A character generation software algorithm implemented by computer 68 may perform the function of character generator unit 138, and may thus replace unit 138. Monitors 137 and 139 display the "preview" outputs of units 67 and 138, respectively, so that an operator may operate units 67 and 138 "off-line" to preset their respective outputs before the outputs are fed to switch SW-2.

Switch SW-2 may be controlled by appropriately programmed computer 68 in a conventional manner.

The composite video signal emerging from PIP device 120 is supplied to active video switch SW-1. The other inputs of switch SW-1 are connected; respectively, to the output of switch SW-2 at a "loop through" video feed of quad compression unit 119, and to the output of video signal storage unit 65. Switch SW-1 selects the output of storage unit 65 in order to play back a video program stored in unit 65 to the local and remote module monitors (for example, to insert a prerecorded videotape into the record of a court proceeding). Switch SW-1 selects the output of switch SW-2 to feed to the local and remote module monitors a full-screen version of the still frame signal or video prompt being supplied to unit 119 for compression.

The output of switch SW-1 is coupled to time-date generator 122, which adds ("burns") time and date information to the video signal emerging from switch SW-1. The output of generator unit 122 is amplified in video amplifier 124, and the amplified signal produced in unit 124 is supplied to each of remote module monitor 100, video relay R-2, and video playback/record units 64, 65, and 66. Units 64-66 may be conventional video tape playback/recording units.

One input of relay R-2 is connected to the output of amplifier 114, so that local module monitors 11, 12, and 13 normally display the amplified output of remote module video camera 102. Another input of relay R-2 is connected to line E, which supplies the video output of video recording/playback unit 65 to switch SW-2. When relay R-2 is commanded to select the video signal output from unit 65, this video signal is displayed on local module monitors 11, 12, and 13 instead of the amplified output of remote module video camera 102.

The output of relay R-2 is supplied to amplifier 126, and the output of amplifier 126 is supplied to all the local module monitors (including monitors 11, 12, and 13). Relay R-2 is preferably a double pole, double throw relay connected to a control panel 25 associated with local module monitor, so that the conferee served by monitor 11 (for example, a judge) may toggle a control on panel 25 to select either the amplified output of remote module video camera 102 or the video output of unit 65, regardless of which of these two signals is being supplied to the other local module monitors at any moment.

The audio signal processing system components will next be described with reference to FIG. 6. In the FIG. 6 circuit, there are six audio input signals: the output of each of local module microphones CM-1, CM-2, CM-3, and CM-4; remote module microphone M-5; and the left and right channels (L and R) of the audio output produced by video recording unit 65 (shown in FIG. 5) in its playback mode.

In the preferred embodiment in which the system's local module is a courtroom, the judge is preferably provided with a control panel 25 (shown in FIGS. 1 and 5). Switches SW-4, SW-5, and SW-6 (shown in FIG. 6) are preferably positioned as part of control panel 25. These switches allow the judge to interrupt recording of any or all of the microphone signals. Two control panels identical to control panel 25 are included in an alternative embodiment of the system of FIGS. 5 and 6, one panel for use by the judge and the other for use by another court officer (or local conferee).

Switch SW-4 is preferably a double pole, double throw ("DPDT") switch. One pole feeds a direct current signal either to green LED status indicator 140 or red LED status indicator 141 on the control panel. When the operator of switch SW-4 wishes to interrupt recording of the output of microphone CM-1, the operator toggles switch SW-4, activating relay R-3. When activated, relay R-3 interrupts recording of the audio signal from the judge's microphone (CM-1). Similarly, to prevent the output of remote module microphone M-5 from reaching local module loudspeakers 131, 132, and 133, the operator toggles switch SW-6, activating relay R-6. When activated, relay R-6 prevents the audio signal from remote module microphone M-5 from reaching amplifier 134 and thereafter local module loudspeakers 131, 132, and 133, without interrupting recording of the audio signal from microphone M-5. Switch SW-5 is tied to both relay R-3 and R-6 by a diode network, so that when switch SW-5 is toggled, both relays R-3 and R-6 are activated. In an alternative embodiment, SW-5 is also connected to relay R-4, so that when switch SW-5 is toggled, all three of relays R-3, R-4, and R-6 are activated. When all three of relays R-3, R-4, and R-6 are activated, they prevent recording of the audio signals from all the local module microphones, but not the audio signal from remote module microphone M-5.

Each of video signal recording/playback units 64, 65, and 66 (shown in FIG. 5) accepts four individual audio input signals, so that the system has a total of twelve audio input channels. Each of units 64, 65, and 66 may be a conventional stereo video tape cassette recorder that has been modified in a well known manner to accept four audio input signals (i.e., the normal Left and Right stereo channels plus the "Hi Fi" Left and Right channels), rather than just two (i.e., the normal Left and Right stereo channels).

The audio signals from microphones CM-1, CM-2, CM-3, CM-4, and M-5 (and the audio signals L and R, which are combined together and then supplied to amplifier SA-2, during playback of a prerecorded audio/video program on unit 65) are supplied to desired ones of the system's twelve audio input channels. It is contemplated that the audio input signals from microphones CM-1, CM-2, CM-3, and CM-4 (or a subset of these signals) will be mixed for recording on a single one of the twelve audio input channels. In the FIG. 6 circuit, these four input signals interface with mixed signal line M at computer-controlled interface units 170, 171, 172, and 173, respectively. Each of units 170, 171, 172, and 173 is capable of applying variable gain to its input audio signal, and then routing the amplified audio signal to line M. The amplified audio signals are thus combined to generate a mixed audio signal which propagates on line M to relay R-7. An operator in the control module may supply control signals to interface units 170, 171, 172, and 173 (such as on a set of lines not shown in FIG. 6 for greater clarity) to control the gain applied by each interface unit to the input audio signals to be mixed for transmission on line M to relay R-7 as a mixed audio signal. The relative amplitudes of the components of such mixed signal (the four amplified microphone signals from microphones CM-1, CM-2, CM-3, and CM-4) may thus be controlled by the operator. Alternatively, the gain applied by each interface unit may be automatically controlled using conventional automatic gain control ("AGC") or echo cancelling mixer circuitry.

In order to provide a redundant conference record, not only is the mixed audio signal recorded (on a first audio input channel), but each of the discrete microphone signals from microphones CM-1, CM-2, CM-3, and CM-4 is separately recorded on an audio input channel other than the first audio input channel. The separate permanent records of the discrete microphone signals may be consulted by a transcriber in the event that the record of the mixed signal (on the first channel) is noisy, obscured, or inaudible for any reason.

The microphone signals from microphones CM-1, CM-2, CM-3, and CM-4 are connected to active microphone signal generation unit 174 at nodes F, G, H, and I. Unit 174 monitors these four input signals in a conventional manner to determine which is active at any instant. Unit 174 then outputs to computer 68 an "active microphone" signal indicative of which microphone is active. Alternatively, unit 174 may be omitted, and each of interface units 170–173 provided with audio detection circuitry connected directly to appropriately programmed computer 68 so that each of units 170–173 sends an "active microphone" signal to computer 68. In either embodiment, each microphone input is assigned a computer gate, and computer 68 is continually updated regarding which microphone channel is active at any given moment. When a microphone channel is active ("gated"), computer 68 implements a software algorithm to generate appropriate control signals for instructing video switcher 118 to place the video signal associated with the active microphone channel in the primary picture area of PIP unit 120's composite video signal display.

Each of relays R-3, R-4, and R-6 generates a control signal for computer 68 by connecting to computer 68 either a +5 V DC contact, or a system ground contact. Thus, by connecting the +5 V DC contact to computer 68, the computer is instructed to exclude a corresponding microphone input channel in the mixed audio signal. For example, when relay R-3 is activated by switch SW-4, relay R-3 interrupts the discrete audio path of the judge's microphone (CM-1) output, and by dropping computer 68's reference to "low" starts a software sequence that causes interface unit 170 to mute the output of judge's microphone CM-1 before combining it with the other audio signals on mixed signal line M. The relays of the FIG. 6 circuit (including relays R-3, R-4, and R-6) are interconnected with the other system components so that any of microphone CM-1, microphone M-5, and the set of microphones CM-2, CM-3, and CM-4, may be interrupted without preventing inclusion of the remaining active inputs in the mixed audio signal on line M.

The discrete outputs of microphones CM-1, CM-2, CM-3, and CM-4, are amplified in amplifiers 182 and 183. Each amplified signal emerging from circuits 182 and 183 is supplied to at least one of the twelve audio input channels of recording units 64–66. Unit 183 directs the signals from microphones CM-3 and CM-4 to recording unit 66. Unit 182 directs the signal from microphone CM-2 to recording unit 66.

The output of judge's microphone CM-1 is split in active transformer 160. One output of transformer 160 is sent to recording unit 64, and the other output of transformer 160 is sent to recording unit 65.

All the individual microphone signals are thus discretely recorded on "unmixed" (or "clean") channels of units 64, 65, and 66. This provides a set of backup recordings for use in the event that a portion of the mixed audio signal (the signal supplied from line M to relay R-7) becomes inaudible (such as when several conferees simultaneously speak with substantially the same amplitude).

The output of remote module microphone M-5 is supplied through amplifier 180 to automatic gain control circuit 181. Circuit 181 is required to ensure that level of microphone M-5's signal is consistent with that of the local module microphone signals (especially in view of the fact that microphone M-5 will not normally be under the direct control of an operator in the system's control module).

Both the gain controlled output signal emerging from circuit 181, and the mixed signal on line M, are supplied to relay R-7. Relay R-7 is a four pole relay normalled to pass both these signals to relay R-8. When relay R-7 is activated (for example, when a system operator throws an appropriate switch in the control module's control panel), both signals are replaced by a 1000 Hz audio tone supplied to relay R-7 from tone generator unit 162. The tone is used as a reference by other circuit components downstream from relay R-7.

Relay R-8 receives the output of relay R-7, and the amplified audio signals emerging from amplifier SA-2. Relay R-8 is normalled so that, unless activated, it normally passes the output of relay R-7 to amplifiers ADA-1 and ADA-2. When activated, relay R-8 passes the output of amplifier SA-2 to audio signal amplifiers ADA-1 and ADA-2.

Relay R-8 may be activated as follows. A 12-volt transfer relay may be connected between relay R-8 and switch SW-1 shown in FIG. 5. When switch SW-1 is thrown into its middle position, in which it passes a video playback signal from record/playback unit 65, the transfer relay will connect an available DC voltage source to energize both the 24 Volt DC video relay R-2 and the 24 Volt DC audio relay R-8.

Amplifier ADA-1 has one input terminal for receiving the mixed audio signal from relay R-8, and five output terminals. Three of these output terminals are connected to audio signal recording inputs on record/playback units 64, 65, and 66, respectively. The fourth output terminal is connected to two input terminals of audio monitor select switch SW-7 (to be described below), and the fifth output terminal is connected to remote module amplifier A-8 and loudspeaker 14a.

Amplifier ADA-2 has one input terminal for receiving the remote microphone audio signal from relay R-8, and four output terminals. Two of these output terminals are connected to audio signal recording inputs of record/playback units 64 and 65, respectively. The third output terminal is connected to two input terminals of audio monitor select switch SW-7 (to be described below), and the fourth output terminal is connected to relay R-6 (the remote module microphone interrupt relay). When relay R-6 is active, the audio from ADA-2 is interrupted before it is directed to the local module loudspeakers.

Audio monitor select switch SW-7 is located in the system's control module, and has four input terminals. When the first input is selected, the system operator may listen directly to the output of amplifier ADA-1 as it emerges from speaker 272 after amplification in stereo audio amplifier A-7. The amplified signal emerging from amplifier A-7 may also be displayed by VU meter 270. When the second input of switch SW-7 is selected, the output of amplifier ADA-2 is passed to amplifier A-7. When the third input of switch SW-7 is selected, the output of amplifier SA-2 is passed to amplifier A-7. The third input of SW-7 will thus be selected, for example, when the system operator wishes to cue prerecorded materials on record/playback unit 65 before such prerecorded materials are inserted into the court record. When the fourth input of switch SW-7 is selected, the combined output of amplifiers ADA-1 and ADA-2 are passed to amplifier A-7.

An ordinarily skilled computer programmer will be able readily to generate appropriate computer software for programming computer 68 to control the components of the inventive system in the manner described herein. Computer 68 is preferably a personal computer.

In operation, programmed computer 68 implements the above-described automatic video signal selection operation in software. Alternatively, conventional audio signal comparator circuitry (which may be included in unit 174 of FIG. 6) may perform part of the video selection operation, with programmed computer 68 performing the remaining part of such video selection operation. In either case, each time one of the microphones is determined to be active, computer 68 will send a control signal to video switching unit 118 for instructing unit 118 to send the video signal corresponding to such active microphone directly to PIP device 120 (and to send the other video signals to unit 119). Computer 68 is preferably programmed to send a set of one or more predetermined "default" video signal assignment signals to unit 118 in the event that no microphone is active (i.e., no microphone signal has amplitude exceeding a predetermined minimum amplitude that has been input into the computer) for a predetermined time period that has been input into the computer (such as when no conferee speaks during the predetermined time period). For example, the default assignment signals may cause the judge's image (the video output of camera 21) to be supplied as the "principal" signal to PIP device 120 (for subsequent display in the large picture area of the system's PIP monitor or monitors). The default time period will preferably be adjustable in software by supplying appropriate commands to computer 68.

Another time period that is desirably adjustable in software is the minimum time period during which each microphone must be active before computer 68 will send a corresponding control signal to switching unit 118. This adjustability is desirable to prevent unit 118 from changing the video arrangement in response to insignificant impulsive noises such as a conferee's cough. The computer may be programmed so that both a threshold microphone amplitude and a predetermined minimum microphone signal duration may be input to the computer, and so that each control signal generated by the computer identifies a video camera output signal corresponding to a conferee whose microphone signal has instantaneous amplitude in excess of the predetermined threshold amplitude for a duration exceeding the predetermined minimum duration.

In one preferred embodiment, in which all conferees are in the local module, camera 102 is positioned in the local module (not in the remote module) and aimed so as to provide a wide angle view of the entire local module (i.e., courtroom), or any other desired view of the local module. In this embodiment, computer 68 is preferably programmed so that the predetermined default video signal assignment signals cause the output of camera 102 to be supplied as the "principal" signal to PIP device 120. This embodiment is useful for generating a combined audio/video record of a local module conference (such as a court proceeding in which all participants are present in court).

It is also desirable that programmed computer 68 control which video prompts are passed by switch SW-2 to unit 119. For example, programmed computer 68 should recognize when the judge "kills" one of the system microphones (by actuating one of switches SW-4, SW-5, or SW-6), and in this event, computer 68 should generate appropriate control signals for causing devices 67, 138, switches SW-1, SW-2, and relay R-2 to route an appropriate video prompt for display on monitors 11, 12, and 13.

Each video prompt available for display, and stored in device 67 or 138, has a storage matrix address. Thus, each prompt may be modified or replaced without modifying the software residing in computer 68. Accordingly, any of a number of foreign language translations of each English language video prompt may be stored, and selected for display. During initialization of the system prior to a courtroom proceeding (or other conference) the system operator may input a language parameter to computer 68, and in response thereto the computer software will shift the video prompts corresponding to such language parameter into the proper area in the prompt storage matrix (so that they are available for display during the conference).

The invention's capacity to select desired ones of a set of stored video prompts is advantageous for several reasons. For example, in the inventive system the selected video prompts are available for inclusion in the permanent conference record to indicate any externally made adjustments to the audio signal selection during system operation. Inclusion of such prompts in the record will eliminate ambiguity regarding whether loss of any portion of the audio record was accidental, or commanded by one of the local conferees (i.e., the judge in a courtroom proceeding).

Computer 68 may be programmed to perform a diagnostic check of various system components during initialization of the system prior to a conference.

In a preferred embodiment to be described next with reference to FIGS. 7, 8, and 9, the invention employs a composite video signal generating means 220 instead of PIP unit 120 and compression unit 119. In this embodiment, composite signal generating means 220 includes video switching circuitry for receiving six video signals (such as the output of all of cameras 21, 22, 23, 24, and 102, as well as the output of switch SW-2), and including hardware or software (or both) for compressing five of these signals for display in a different small picture area of a video monitor screen, as well as hardware or software (or both) for selecting the sixth signal for display as a "principal" component signal in the large picture area of the monitor screen (i.e., picture area 200 of video monitor screen 210 in FIG. 4A). For example, the five "non-principal" component video signals (comprising the composite video signal emerging from the composite signal generating means in this embodiment) may be displayed in the small picture areas 201, 202, 203,204, and 205 of video monitor screen 210.

Figure 9:
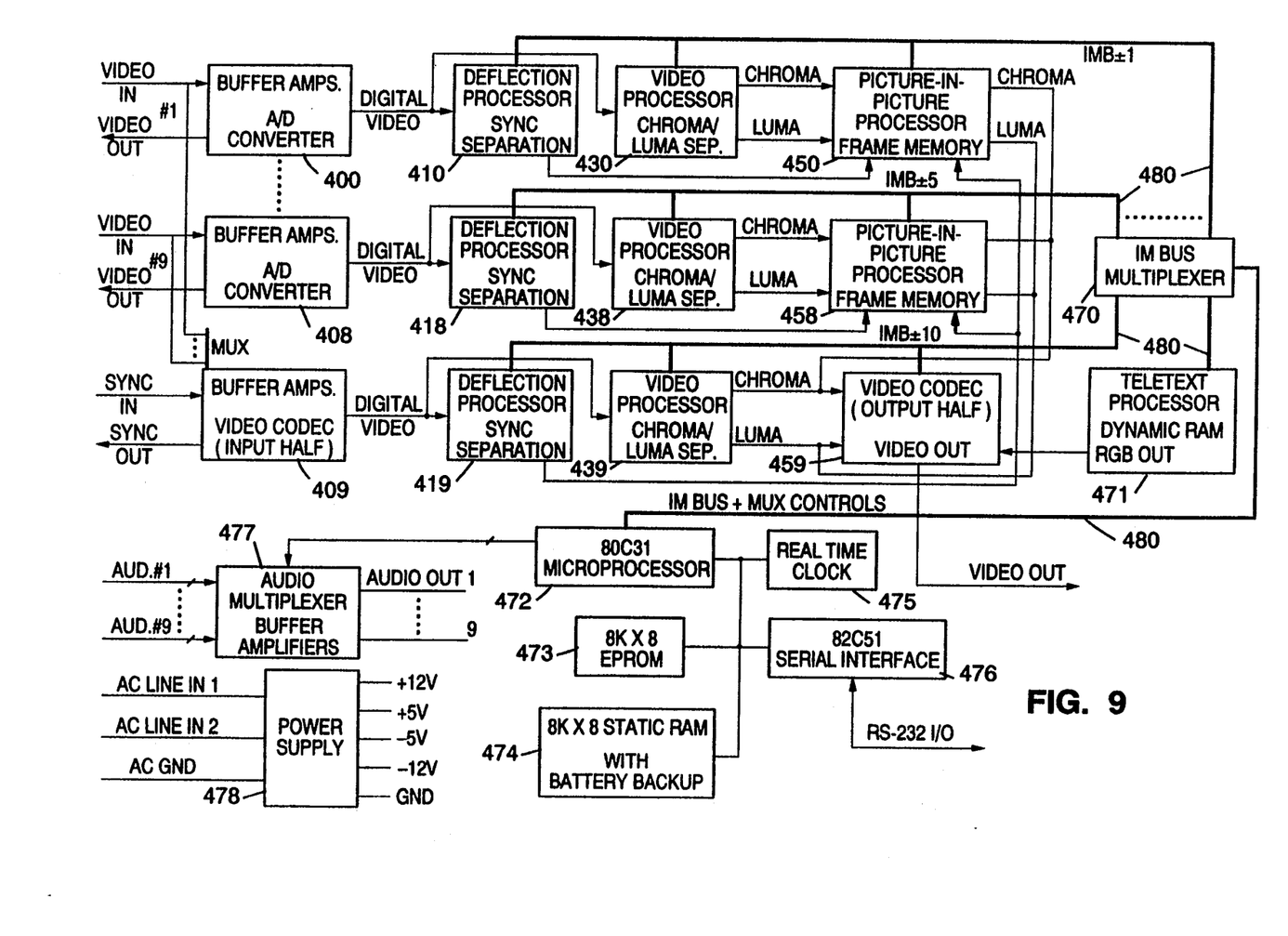
FIG. 9 is a block diagram of a preferred composite video signal generation circuit for use with the FIG. 7 embodiment.

A preferred embodiment of circuit 220 is shown in FIG. 9. In the FIG. 9 embodiment, circuit 220 receives ten video inputs. The first nine inputs are received at buffer amplifier/digitizer 400, buffer amplifier/digitizer 408, and seven buffer amplifier/digitizer circuits 401–407 (not shown in FIG. 9) identical to circuits 400 and 408. The tenth input is a black background signal received at buffer amplifier/video codec circuit 409.

To generate a composite video signal having six component images (as shown in FIG. 4A), only six of circuits 400–408 receive video input signals, and three of picture-in-picture processors 450–458 are effectively disabled (in a manner to be described below).

The input terminal of each of circuits 400–409 preferably terminates with a 75 ohm resistor. Preferably, each of circuits 400–409 buffers the video source signal at its input terminal through a first unity gain amplifier, and loops the buffered video output of such first amplifier through a second unity gain amplifier to drive the "Sync Out" and "Video Out" lines shown in FIG. 9.

The buffered output of each of the first unity gain amplifiers is digitized by an A-to-D converter within each of circuits 400–409 (for example, a VAD2150 analog to digital conversion circuit, available from ITT) and then supplied to the respective one of deflection processor circuits 410–419 for sync separation (although only processors 410 and 418 are shown, it is contemplated that the system include ten deflection processors 410–419, one for each of the ten circuits 400–409). The sync signals emerging from deflection processors 410–418 are supplied to picture-in-picture processors 450–458, and the sync signal emerging from deflection processors 419 is supplied to video codec circuit 459.

The digitized video signals from circuits 400–409 are also supplied to video processors 430–439 for extraction of digital chroma and luminance data. The chroma and luminance data output from processors 430–39 are supplied to picture-in-picture processors 450–458 and video codec circuit 459. Circuits 410–419 are preferably DPU2553 deflection processor circuits (available from ITT), circuits 430–439 are preferably CVPU2235 integrated circuits (available from ITT), and picture-in-picture processors 450–458 are preferably PIP2250 integrated circuits (available from ITT).

Each of processors 450–458 includes a means for producing a compressed image from the received chroma and luminance data, and a frame memory (preferably a pair of dynamic RAM circuits, each having 64K×4 bit capacity) for storing a video frame representing this compressed image. Each of processors 450–458 includes skew control and position registers to allow precise positioning of the compressed image within the frame.

Processors 450–458 are connected to a parallel chroma and luminance data base. The stored compressed image data are read out sequentially from processors 450–458 in response to control signals distributed through IM Bus multiplexer 470 from microcontroller 472 (to be described below).

Video codec circuit 459 outputs a composite analog video signal having "black" background data (from video processor 439) in its active video area except during such times as processors 450–458 disable video processor 439 and substitute stored compressed images for the "black" background data. Thus, a composite digital video signal is input to video codec 459 during the readout cycle of processors 450–458. The content of the composite digital video signal depends upon the content of the frame memories of processors 450–458 during the readout cycle, and upon which of circuits 400–408 have received an active video source signal. If no active video source signal is supplied to one of circuits 400–408, no sync pulses from the corresponding one of deflection processors 410–418 are emitted. In this case a watchdog timer within the corresponding one of processors 450–458 prevents the disabling of the black background signal during the corresponding portion of the readout cycle of processors 450–458. The result is automatic blanking of unused video inputs in the composite video output signal.

Codec circuit 459 includes high-speed D-to-A conversion circuitry which converts the described digital composite video signal (at its input terminal) into the analog composite video signal labeled "Video Out" (at its output terminal).

It is contemplated that control signals distributed through IM Bus multiplexer 470 from microcontroller 472 will prevent processors 450–458 from disabling the black background signal during times that correspond to a mask (or border) around each component image of the displayed composite video signal. In this way, the system creates a black mask framing each component image of the composite video signal.

Teletext processor 471 supplies alphanumeric information for display as an overlay on the composite video output signal. The alphanumeric information is supplied from microcontroller 472 (which may be an Intel 80C31 microprocessor programmed to emulate an ITT CCU2030 central control unit) over IM bus 480 to processor 471. Processor 471 includes a small 64K×1 bit RAM circuit capable of storing up to eight pages of text information. Processor 471 intercepts RGB signals from the output of codec 459 (which may be an ITT VCU 2133 video codec circuit) and substitutes its own information at the appropriate times to place ASCII alphanumeric text on the monitor which displays the composite video signal output from codec 459.

The components of the FIG. 9 system operate under control of signals transmitted through IMB serial bus 480 from microcontroller 472. User inputs from serial port 476 are translated by microcontroller 472 into instructions compatible with IM Bus 480. In a preferred embodiment in which elements 450–459, 470, and 471 are ITT DIGIT 2000 devices, serial port 476 is an RS-232C serial port, and microcontroller 472 is an Intel 80C31 microcontroller programmed to translate RS-232C commands into a format compatible with the IM Bus of the ITT DIGIT 2000 devices.

Read only memory 473 (preferably an 8K×8 bit EPROM circuit) and random access memory (preferably an 8K×8 bit static RAM circuit, with battery backup) are provided for use by microcontroller 472. Real time clock 475 provides timing signals for use by microcontroller 472, serial interface 476, EPROM 473, and RAM 474.

Audio multiplexer circuit 477 receives up to nine stereo audio input channel pairs, and connects any one of the input channel pairs via analog switches in response to an audio select command from microcontroller 472. Preferably, each audio output signal is buffered to drive a short external cable.

Grounded power supply 478 receives AC line power, and outputs +12 VDC, +5 VDC, −5 VDC, and −12 VDC power.

In an alternative embodiment, circuit 220 includes a cascade of five conventional PIP units (of the same type as unit 120 shown in FIG. 5). The function of each PIP unit is to combine a first component video input with a second input signal. Each PIP unit except the first receives as the "second input signal" the composite video output signal from the previous PIP unit in the cascade. The last PIP unit in the cascade receives the "principal" component signal as its "first component input signal" and compresses this principal component signal for display as a full video image in a picture area corresponding to large picture area 200 of FIG. 4A.

Figure 7:
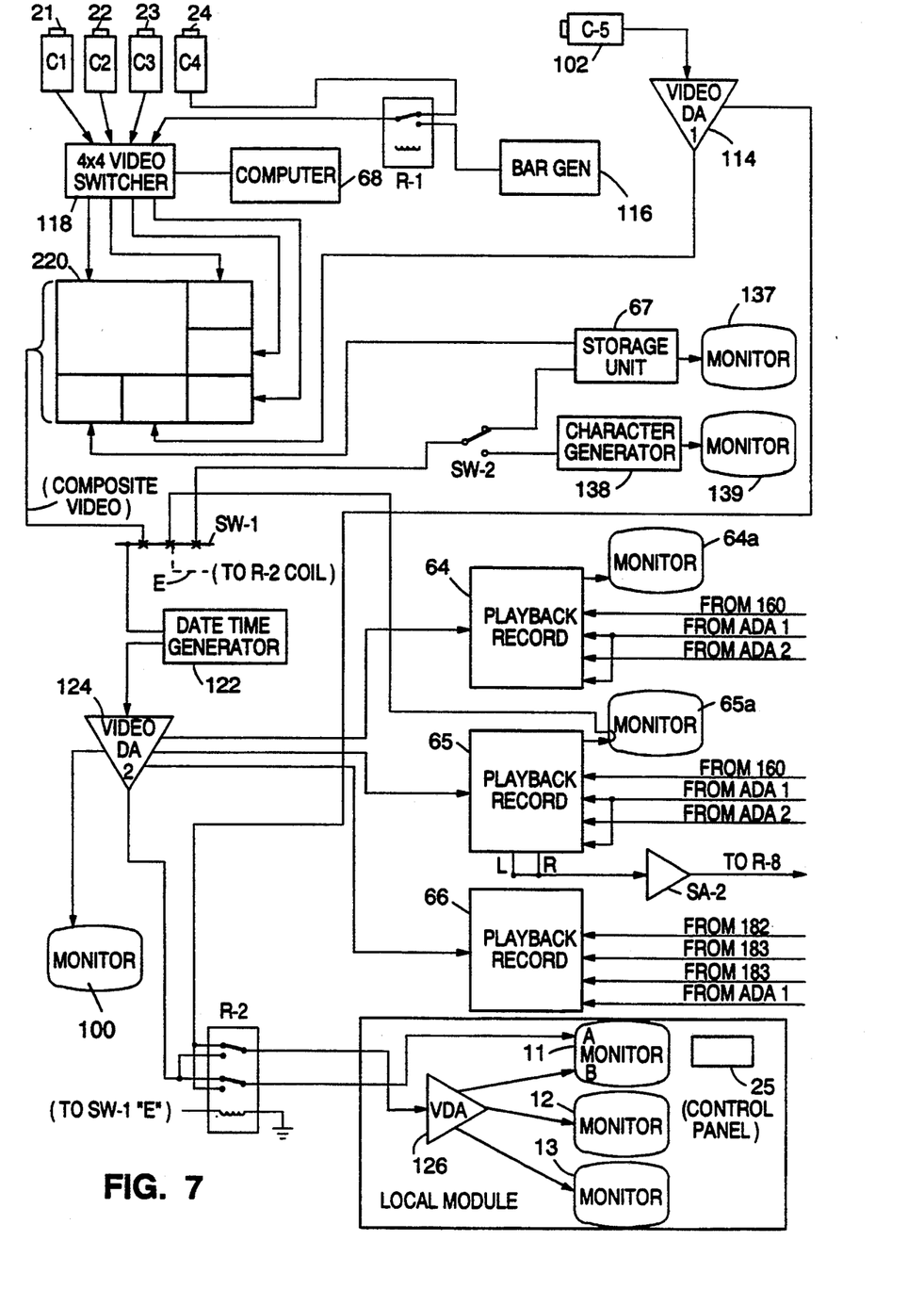
FIG. 7 is a diagram of a first portion of a preferred embodiment of the invention.
Figure 8:
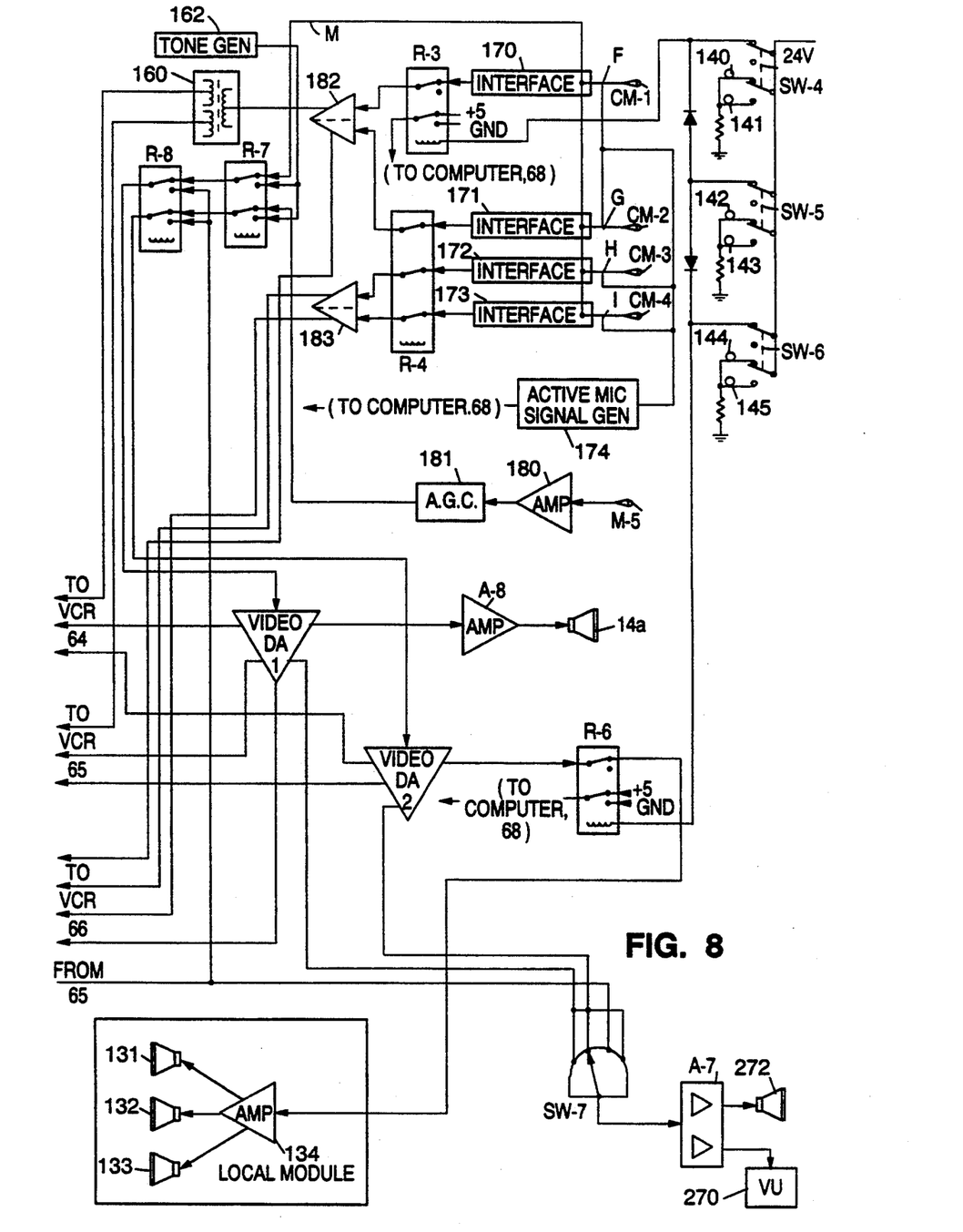
FIG. 8 is a diagram of a second portion of the embodiment partially shown in FIG. 7.

The FIG. 7 embodiment also differs from the FIG. 5 embodiment in that devices 67 and 138 are directly connected to the input terminals of composite signal generating means 220 in FIG. 7, while they are connected only through switch SW-2 to compression unit 119 in FIG. 5.

The foregoing is merely illustrative and explanatory of the invention. Any number of conferee stations may be included in the local module, and any number of remote modules may be included in the inventive system, to accommodate any number of local and remote conferees. Any group of conferees may use the system. The remote module need not be used by a criminal defendant, and instead may be used by a witness in a civil proceeding, or by any other type of user. The remote module may be omitted from the inventive system, so that all system components are located at a local station. A single loudspeaker may be provided at the local module for shared use by all local conferees, or a loudspeaker may be provided for each local conferee. Other changes in system configuration, in the number and type of system components, and in other details of the described embodiments may be within the scope of the appended claims.

What is claimed is:

1. An interactive video conferencing system for use by at least a first conferee and a second conferee in a local module and a third conferee in a remote module, including:
   a first video camera in the local module and aimed at the first conferee, for generating a first video signal representing an image of the first conferee;
   a second video camera in the local module and aimed at the second for generating a second video signal representing an image of the second conferee;
   a video monitor having six discrete screen display areas in the remote module;
   a composite video signal generation unit connected to the first video camera, the second video camera, and the monitor for receiving the first and the second video signals, generating a composite video signal from the first and the second video signals, and sending the composite video signal to the monitor for display, with the first video signal displayed on the monitor as a full video image in a large picture area, and the second video signal displayed on the monitor as a full video image in a small picture area.

2. The system of claim 1, also including:
   a partially reflecting mirror in the remote module and a substantially transparent screen positioned in the remote module relative to the monitor so that the mirror reflects the displayed composite video signal through the screen, so that the third conferee may view the reflected displayed composite video signal through the screen; and
   a third video camera, positioned in the remote module and aimed at the screen, wherein the third video camera is positioned relative to the mirror so that when the third conferee views the reflected displayed composite video signal, light reflected from the third conferee will propagate through the screen and the mirror to the third video camera.

3. The system of claim 1, also including:
   a means for supplying a video prompt to the monitor, in a manner so that the video prompt is another component video signal of the composite video signal.

4. An interactive video conferencing system for use by a set of conferees, including:
   a video camera for each of the conferees, wherein each said camera generates a video signal representing a full video image;
   a video monitor for each of the conferees, wherein each said monitor has a large picture area and at least one small picture area;
   a composite video signal generation unit connected to the video cameras and to the video monitors for receiving the video signals, generating a composite video signal from the video signals, and sending the composite video signal to the monitors for display, with the video signals displayed on each monitor as a full video image in the large picture area, and each of the other video signals displayed on each monitor as a full video image in the large picture area, and each of the other video signals displayed on each monitor as a full video image in a distinct one of the small picture areas;
   a microphone for each of the conferees, wherein each said microphone generates a microphone signal;
   video signal selection means for receiving the microphone signals, identifying an active one of the microphone signals, and sending a control signal to the composite video signal generation unit, wherein the control signal identifies said principal one of the video signals, and said principal one of the video signals corresponds to the active microphone signal.

5. The system of claim 4, wherein the video signal selection means includes a programmed computer for generating the control signal.

6. The system of claim 5, wherein the computer is programmed to generate the control signal in such a manner that, at any instant, the control signal is indicative of the video signal of the one of the conferees whose microphone is active, and has been active for the longest time.

7. The system of claim 5, wherein the computer is programmed to generate a default control signal, for transmission to the composite video signal generation unit in the event that no microphone signal has instantaneous amplitude in excess of a predetermined threshold amplitude during a predetermined time period.

8. The system of claim 7, wherein one of the conferees is a judge, the conferees are participants in a court proceeding, and the default control signal identifies the judge's video signal as the principal one of the video signals.

9. The system of claim 5, wherein the computer is programmed to generate the control signal in such a manner that, at any instant, the control signal is indicative of a video signal corresponding to the conferee whose microphone signal has instantaneous amplitude in excess of a predetermined threshold amplitude for a duration exceeding a predetermined minimum duration.

10. The system of claim 4, wherein the large picture area has a first aspect ratio and each of the small picture areas has an aspect ratio substantially identical to the first aspect ratio.

11. The system of claim 4, wherein the monitor has a screen, and the large picture area is positioned at the upper left of the monitor's screen.

* * * * *